US009722920B2

(12) United States Patent
Nakashima

(10) Patent No.: US 9,722,920 B2
(45) Date of Patent: Aug. 1, 2017

(54) APPARATUS AND METHOD FOR GENERATING ROUTING DATA USED IN A TREE-SHAPED CONNECTION

(71) Applicant: FUJITSU LIMITED, Kawasaki-shi, Kanagawa (JP)

(72) Inventor: Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 223 days.

(21) Appl. No.: 14/603,897

(22) Filed: Jan. 23, 2015

(65) Prior Publication Data

US 2015/0256451 A1 Sep. 10, 2015

(30) Foreign Application Priority Data

Mar. 5, 2014 (JP) ................................ 2014-042468

(51) Int. Cl.
*H04L 12/701* (2013.01)
*H04L 12/753* (2013.01)
*H04L 12/931* (2013.01)

(52) U.S. Cl.
CPC .............. *H04L 45/48* (2013.01); *H04L 49/00* (2013.01)

(58) Field of Classification Search
None
See application file for complete search history.

(56) References Cited

U.S. PATENT DOCUMENTS 6,859,455 B1 * 2/2005 Yazdani ............ G06F 17/30985 370/392
2010/0097934 A1 * 4/2010 Hendel .................. H04L 45/04 370/237
2011/0268118 A1 * 11/2011 Schlansker ......... H04L 12/4641 370/392

FOREIGN PATENT DOCUMENTS

JP 11-110362 4/1999
JP 11110362 A * 4/1999

OTHER PUBLICATIONS

Akira Naruse et al. "A Proposal and Evaluation of All-to-all Algorithm for Multi-core PC Cluster Systems", Symposium on Advanced Computing Systems and Infrastructures (SACSIS), 2010, 8 pages ( with English Abstract).

* cited by examiner

*Primary Examiner* — Hassan Phillips
*Assistant Examiner* — Ayanah George
(74) *Attorney, Agent, or Firm* — Oblon, McClelland, Maier & Neustadt, L.L.P.

(57) ABSTRACT

An apparatus generates routing data that defines, in a system in which a plurality of switches are connected to each other in a tree-shaped structure, a communication route between a plurality of end switches located at a lower level in the tree-shaped structure and a plurality of upper-level switches located at a level higher than the plurality of end switches in the tree-shaped structure, so that a first upper-level switch that switches communication data from a first node connected to a first end switch among the plurality of end switches to a second node connected to a second end switch among the plurality of end switches is identical with a second upper-level switch that switches communication data from the second node to the first node. The apparatus stores the generated routing data in a memory provided for the apparatus.

5 Claims, 25 Drawing Sheets

FIG. 13

```
for(i=1;i<size;i++){
        x1 = i;
        y1 = 0;
        x2 = size - 1;
        y2 = size - 1 - i;
        while(matrix[IDX(x1, y1)] == 0){

                swid = getminswid(x1, y1);
                matrix[IDX(x1, y1)] = swid;
                matrix[IDX(y1, x1)] = swid;
                x1++;
                y1++;

                if(matrix[IDX(x2, y2)] != 0){
                        break;
                }

                swid = getminswid(x2, y2);
                matrix[IDX(x2, y2)] = swid;
                matrix[IDX(y2, x2)] = swid;
                x2-- ;
                y2-- ;
        }
}
```

FIG. 14

```
int
getminswid(int x, int y)
{
        int i;
        unsigned char retval = 1;

retry:
        for(i=0;i<size;i++){
                if(matrix[IDX(i, y)] == retval){
                        retval++;
                        goto retry;
                }
        }

        for(i=0;i<size;i++){
                if(matrix[IDX(x, i)] == retval){
                        retval++;
                        goto retry;
                }
        }

        return retval;
}
```

FIG. 16

| | 0 | 1 | 2 | 3 | 4 |
|---|---|---|---|---|---|
| 0 | – | ① | ⑤ | ⑧ | ⑩ |
| 1 | ① | – | ③ | ⑦ | ⑨ |
| 2 | ⑤ | ③ | – | ④ | ⑥ |
| 3 | ⑧ | ⑦ | ④ | – | ② |
| 4 | ⑩ | ⑨ | ⑥ | ② | – |

FIG. 17

| | 0 | 1 | 2 | 3 | 4 |
|---|---|---|---|---|---|
| 0 | – | 1 | 4 | 2 | 6 |
| 1 | 1 | – | 2 | 4 | 3 |
| 2 | 4 | 2 | – | 3 | 5 |
| 3 | 2 | 4 | 3 | – | 1 |
| 4 | 6 | 3 | 5 | 1 | – |

FIG. 21

```
/* n : nodenum */
for(self=0;self<n;self++){
        offset = self / d;

        /* i: phase */
        for(i=0;i<nodenum;i++){
                dest[self][i] = (d*offset+(self + (offset + i/d + i)% d)%d + d*(i/d))%n;
        }
}
```

APPARATUS AND METHOD FOR GENERATING ROUTING DATA USED IN A TREE-SHAPED CONNECTION

CROSS-REFERENCE TO RELATED APPLICATION

This application is based upon and claims the benefit of priority of the prior Japanese Patent Application No. 2014-042468 filed on Mar. 5, 2014, the entire contents of which are incorporated herein by reference.

FIELD

The embodiments discussed herein are related to apparatus and method for generating routing data used in a tree-shaped connection.

BACKGROUND

All-to-all communication is collective communication in which each node that is connected to a network performs transmission and reception of communication data for all of the nodes (including the each node) that are connected to the network. In the all-to-all communication, an appropriate communication algorithm varies depending on the size of communication data or a network topology. For example, when the size of the communication data is smaller than the size of general communication data, the communication delay and the number of communications become bottlenecked. Therefore, a communication algorithm is selected by which the communication delay hardly occurs, and the number of communications is reduced. In addition, the size of the communication data is larger than the size of general communication data, the width of the communication bandwidth becomes bottlenecked. Therefore, a communication algorithm is selected by which the width of the communication bandwidth is widely obtained.

The following technology of all-to-all communication is known. For example, in each computer in a parallel computer system, the speed-up of the communication is achieved by determining a communicating party at each phase so that the communication standby state does not occur.

In addition, the following technology of all-to-all communication is also known. For example, in order to avoid the occurrence of Head-of-Line (HoL) blocking in a network switch of a multi-core personal computer (PC) cluster, a 2-Level Ring algorithm is employed instead of a Ring algorithm. As a result, the HoL blocking is avoided, and a reduction in the utilization efficiency of the network is avoided when the all-to-all communication is performed.

The all-to-all communication is also performed in a fat-tree type system in which a network topology having a tree-shaped structure, called a fat-tree, is employed. The fat-tree type system is, for example, a system in which network switches are connected to each other at multiple-stages, and a plurality of highest-order network switches are provided, as illustrated in FIG. 1. In the example of FIG. 1, Leaf switches 1 to 3 are arranged at the positions of the end of the fat-tree, and Spine switches 1 to 3 are arranged as higher-order network switches than the Leaf switches 1 to 3. Nodes are connected to each of the Leaf switches 1 to 3. For example, nodes 0 to 2 are connected to the Leaf switch 1, and nodes 3 to 5 are connected to the Leaf switch 2, and nodes 6 to 8 are connected to the Leaf switch 3. It is assumed that communication data that is exchanged between the nodes passes through one of the Spine switches 1 to 3.

In the system of such a fat-tree type, the influence range is increased when a failure occurs in the network switch unless a communication algorithm is appropriate for the all-to-all communication. However, in the above-described related arts, such a problem is not considered.

The related art is discussed in Japanese Laid-open Patent Publication No. 11-110362.

In addition, the related art is also discussed in Naruse Akira, Nakashima Kohta, Sumimoto Shinji, and Kumon Kouichi, "A Proposal and Evaluation of All-to-all Algorithm for Multi-core PC Cluster Systems", Symposium on Advanced Computing Systems and Infrastructures (SACSIS) 2010, pp. 311-318, May 2010.

SUMMARY

According to an aspect of the invention, an apparatus generates routing data that defines, in a system in which a plurality of switches are connected to each other in a tree-shaped structure, a communication route between a plurality of end switches located at a lower level in the tree-shaped structure and a plurality of upper-level switches located at a level higher than the plurality of end switches in the tree-shaped structure, so that a first upper-level switch that switches communication data from a first node connected to a first end switch among the plurality of end switches to a second node connected to a second end switch among the plurality of end switches is identical with a second upper-level switch that switches communication data from the second node to the first node. Then the apparatus stores the generated routing data in a memory provided for the apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a diagram illustrating an example of a program that is used for processing executed by a routing-data generation device, according to an embodiment;

FIG. 14 is a diagram illustrating an example of a program that is used to execute the Spine switch determination processing, according to an embodiment;

FIG. 16 is a diagram illustrating an example of processing that is executed by a routing-data generation device, according to an embodiment;

FIG. 17 is a diagram illustrating an example of processing that is executed by a routing-data generation device, according to an embodiment;

FIG. 21 is a diagram illustrating an example of a program that is used for processing executed by a node, according to an embodiment;

DESCRIPTION OF EMBODIMENTS

Figure 1:
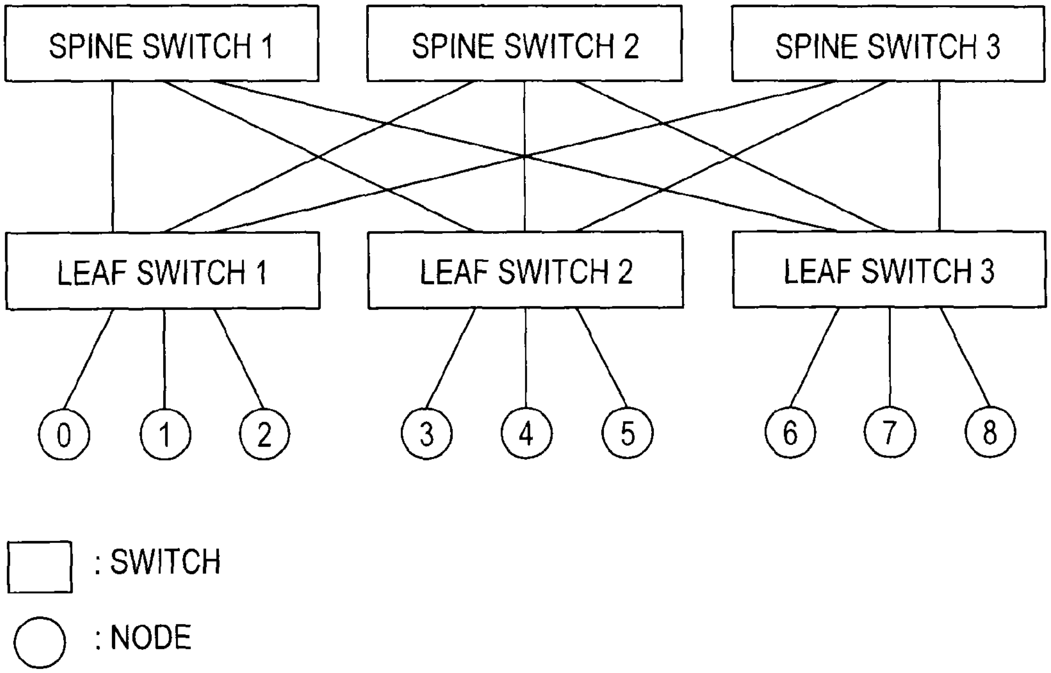
FIG. 1 is a diagram illustrating an example of a fat-tree type system.
Figure 3:
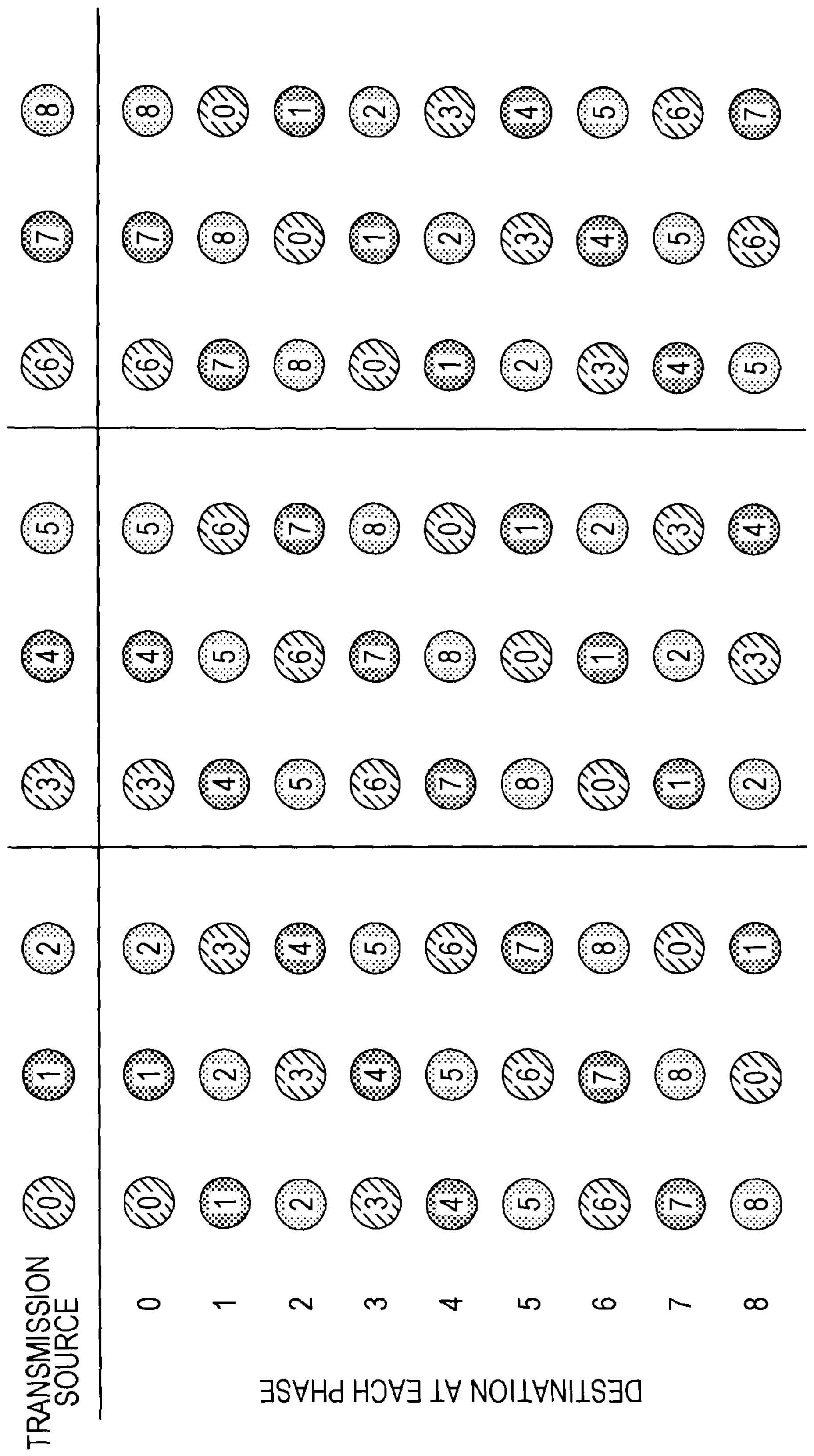
FIG. 3 is a schematic diagram illustrating an example of all-to-all communication that is performed in a fat-tree type system, according to an embodiment.
Figure 4:
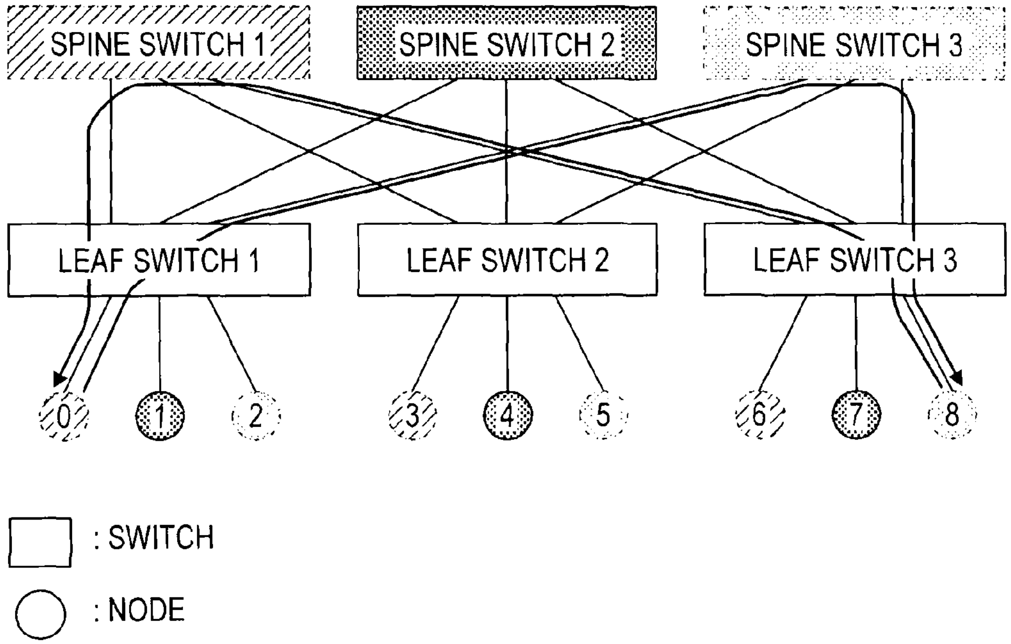
FIG. 4 is a schematic diagram illustrating an example of all-to-all communication that is performed in a fat-tree type system, according to an embodiment.

All-to-all communication that is performed in a fat-tree type system is described below with reference to FIGS. 2 to 4. First, a scheme that is used to avoid the conflict of a communication route is described briefly with reference to FIG. 2. The system illustrated in FIG. 2 has a configuration that is similar to that of the system illustrated in FIG. 1. The arrow indicates a communication route when a node that is under the control of the Leaf switch 1 transmits communication data to a node that is under the control of the Leaf switch 2 and a node that is under the control of the Leaf switch 3. The arrows of the solid line indicate communication routes when communication data is transmitted to the nodes 4 and 7, and the arrows of the one-dot chain line indicate communication routes when communication data is transmitted to the nodes 3 and 6, and the arrows of the two-dot chain line indicate communication routes when communication data is transmitted to the nodes 5 and 8.

Figure 2:
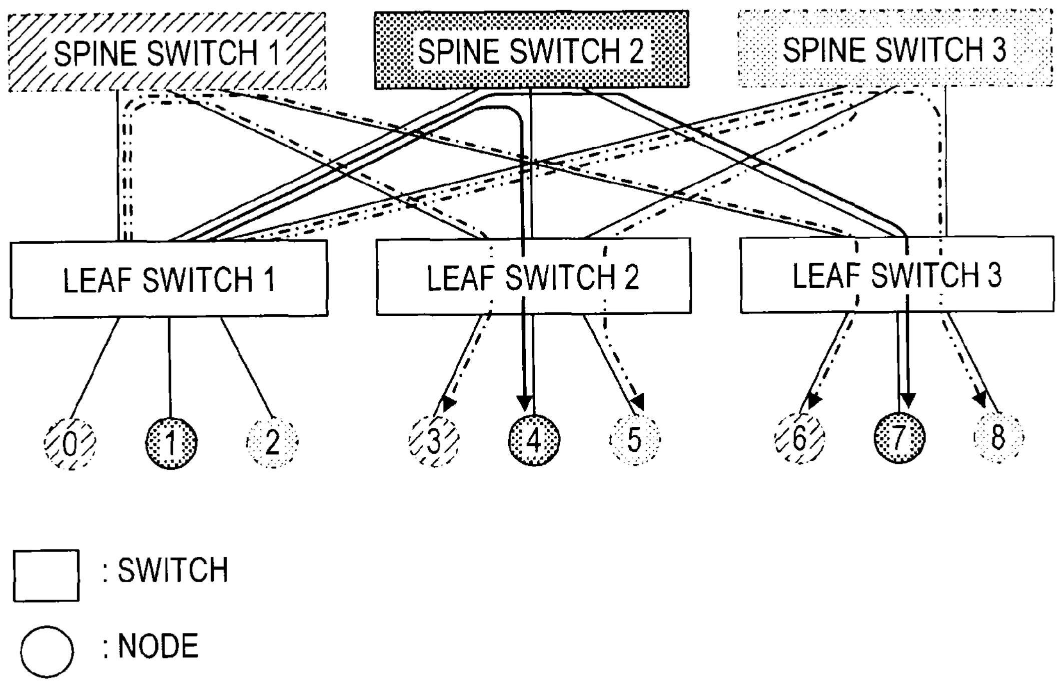
FIG. 2 is a schematic diagram illustrating an example of all-to-all communication that is performed in a fat-tree type system, according to an embodiment.

In FIG. 2, since the two communication routes used when communication data is transmitted to the nodes 4 and 7 pass through the Spine switch 2, the same pattern is applied to the nodes 4 and 7 and the Spine switch 2 in FIG. 2. Since the two communication routes used when communication data is transmitted to the nodes 3 and 6 pass through the Spine switch 1, the same pattern is applied to the nodes 3 and 6 and the Spine switch 1. Since the two communication routes used when communication data is transmitted to the nodes 5 and 8 pass through the Spine switch 3, the same pattern is applied to the nodes 5 and 8 and the Spine switch 3.

As described above, in the fat-tree type system, the conflict of the communication route and the reduction in the communication performance may be avoided by employing a communication algorithm (for example, round robin) that changes a Spine switch through which a communication route passes, depending on a destination.

The all-to-all communication that is performed in the system illustrated in FIG. 2 is described below in detail with reference to FIG. 3. In FIG. 3, exchange of communication data between "n" nodes ("n=9" is satisfied in the example of FIG. 3) is performed at "n" phases. A node having a number "k" (k is an integer of 0 or more to 8 or less) transmits communication data to a node having a number "remainder that is obtained by dividing (k+i) by n" (hereinafter, referred to as "(k+i)%n") at a phase i (i is an integer of 0 or more to 8 or less).

For example, the node 2 transmits communication data to the node 2 at a phase 0, transmits communication data to the node 3 at a phase 1, transmits communication data to the node 4 at a phase 2, transmits communication data to the node 5 at a phase 3, transmits communication data to the node 6 at a phase 4, transmits communication data to the node 7 at a phase 5, transmits communication data to the node 8 at a phase 6, transmits communication data to the node 0 at a phase 7, and transmits communication data to the node 1 at a phase 8. The communication pattern as illustrated in FIG. 3 is called a shift communication pattern.

Therefore, pieces of communication data that have been transmitted from a plurality of nodes that are under the control of an identical Leaf switch, at an identical phase, respectively pass through different Spine switches. As a result, even when pieces of communication data are transmitted from the plurality of nodes at each of the phases at the same time, the conflict of the communication route and the reduction in the communication performance may be avoided.

However, in the method that is described with reference to FIGS. 2 and 3, the forward path and the return path of communication data are different from each other. For example, as illustrated in FIG. 4, communication data that is transmitted from the node 0 to the node 8 passes through the Spine switch 3, but communication data that is transmitted from the node 8 to the node 0 passes through the Spine switch 1. Therefore, when one of the Spine switch 1 and Spine switch 3 fails, it is difficult to perform the communication between the node 0 and the node 8.

Therefore, a method is described below by which the high speed of the communication is maintained, and the reliability and the maintainability are ensured in the all-to-all communication that is performed by avoiding the conflict of the communication route in the fat-tree type system.

Figure 5:
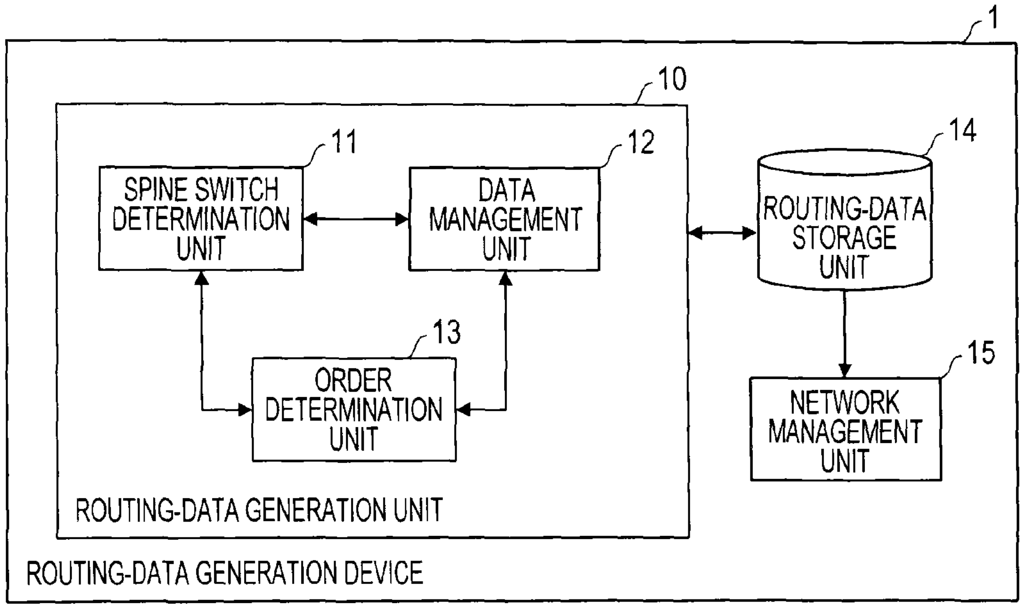
FIG. 5 is a diagram illustrating an example of a functional configuration of a routing-data generation device, according to an embodiment.

In FIG. 5, a functional block diagram of a routing-data generation device 1 according to an embodiment is illustrated. The routing-data generation device 1 includes a routing-data generation unit 10, a routing-data storage unit 14, and a network management unit 15, where the routing-data generation unit 10 includes a Spine switch determination unit 11, a data management unit 12, and an order determination unit 13.

Routing data is matrix data in which a row and a column are defined. The order determination unit 13 determines an element to be processed next, from among a plurality of elements in the routing data, and calls the Spine switch determination unit 11. The Spine switch determination unit 11 determines identification information of a Spine switch, in response to the call from the order determination unit 13, and outputs the determination to the data management unit 12. The data management unit 12 updates the routing data that is stored in the routing-data storage unit 14, using the identification information of the Spine switch, which has been received from the Spine switch determination unit 11.

The routing data that is stored in the routing-data storage unit 14 is displayed on a display device (not illustrated) of the routing-data generation device 1. When an administrator or the like checks the content of the routing data, the administrator or the like builds a fat-tree type system in accordance with the routing data. For example, when communication data between the node 0 that is under the control of the Leaf switch 1 and the node 4 that is under the control of the Leaf switch 2 passes through the Spine switch 1, the Leaf switch 1 and the Spine switch 1 are connected to each other through a cable, and the Leaf switch 2 and the Spine switch 1 are connected to each other through a cable.

When the fat-tree type system that has been built in accordance with the routing data is started up, the network management unit 15 performs setting of routing for the Spine switches and the Leaf switches in the fat-tree type system, based on the routing data that is stored in the routing-data storage unit 14.

Figure 6:
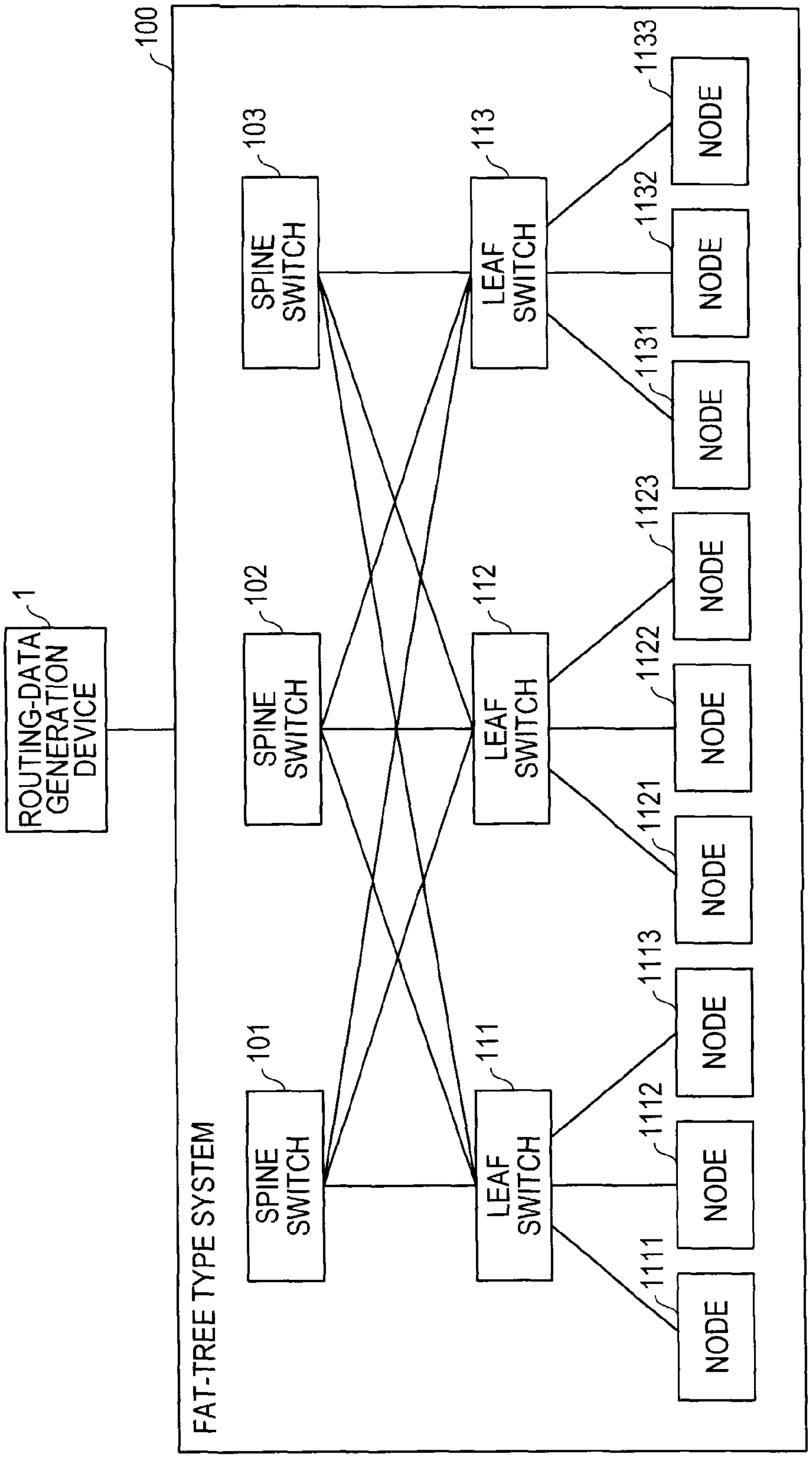
FIG. 6 is a diagram illustrating an example of a system that is built in accordance with routing data, according to an embodiment.

FIG. 6 illustrates an example of a system that is built in accordance with the routing data stored in the routing-data storage unit 14. A fat-tree type system 100 includes Spine switches 101 to 103 that are, for example, local area network (LAN) switches, Leaf switches 111 to 113 that are, for example, LAN switches, nodes 1111 to 1113, nodes 1121 to 1123, and nodes 1131 to 1133. The Leaf switches 111 to 113 are end switches that are located at the end of the fat-tree, and the Spine switches 101 to 103 are upper-level switches that are located at a higher level than end switches in the fat-tree. The number of Spine switches and the number of each Leaf switches are each 3, and the number of nodes is 9, but the embodiment is not limited to such an example.

The devices in the fat-tree type system 100 are connected to each other through a network of InfiniBand. The nodes 1111 to 1113 are connected to the Leaf switch 111, and the nodes 1121 to 1123 are connected to the Leaf switch 112, and the nodes 1131 to 1133 are connected to the Leaf switch 113. Each of the Leaf switches 111 to 113 is connected to the Spine switches 101 to 103. However, such connection between the Spine switches 101 to 103 and the Leaf switches 111 to 113 is merely an example.

Figure 7:
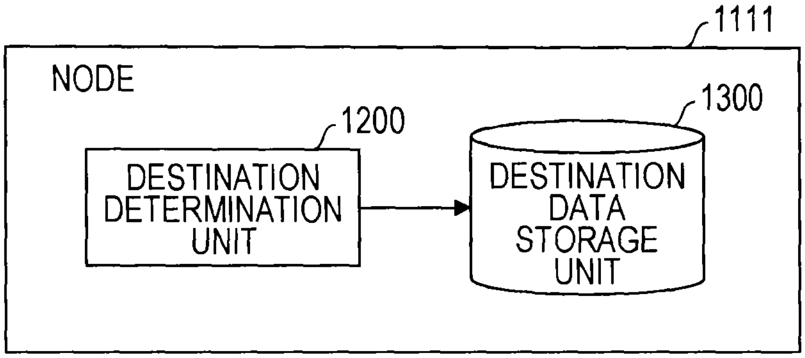
FIG. 7 is a diagram illustrating an example of a functional configuration of a node, according to an embodiment.

The node in the fat-tree type system 100 is a computer that performs communication using a communication library, such as a message passing interface (MPI). In FIG. 7, a functional block diagram of the node 1111 is illustrated. The node 1111 includes a destination determination unit 1200 and a destination data storage unit 1300. The destination determination unit 1200 determines a node that is a destination at each phase, and stores data that indicates the determination content in the destination data storage unit 1300. Since the functional block diagrams of the nodes other than the node 1111 in the fat-tree type system 100 are similar to the functional block diagram of the node 1111, the description thereof will be omitted herein.

Figure 8:
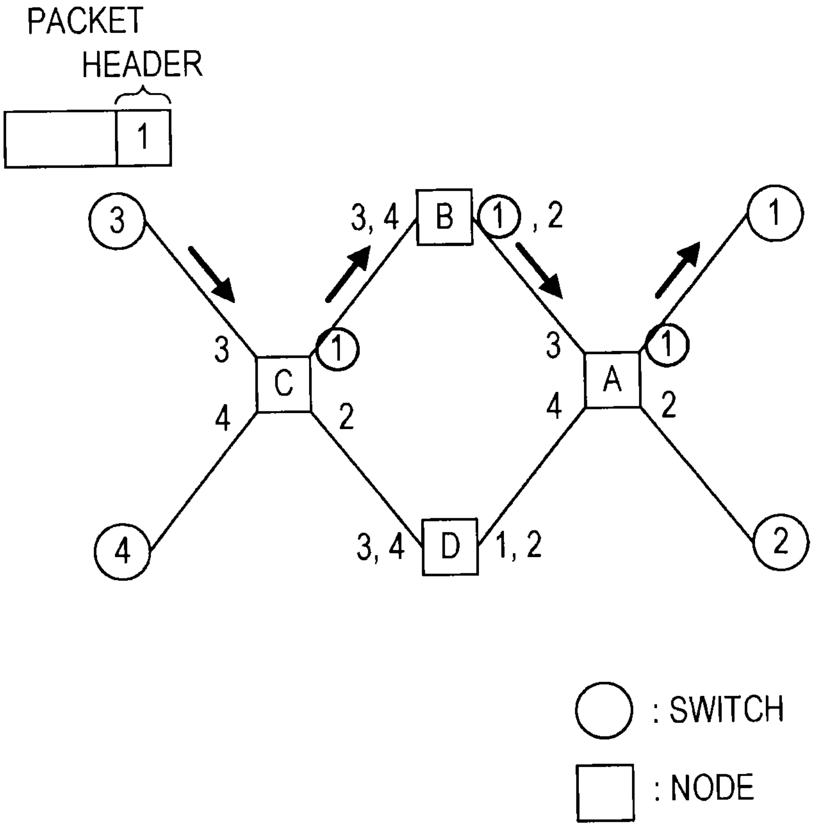
FIG. 8 is a schematic diagram illustrating an example of routing, according to an embodiment.

In the system in which the collective communication such as the all-to-all communication is performed, the network of InfiniBand in which regular and fixed routing is performed is used in order to avoid the conflict of the communication route. The routing in the fat-tree type system 100 is described below with reference to FIG. 8. In FIG. 8, a circle represents a node, and a square represents a switch. A line segment represents a network of InfiniBand, and the numeric value beside the line segment represents identification information of a node that is a destination. The arrow of the thick solid line represents a route of a packet.

In FIG. 8, the node 3 performs transmission of a packet whose destination is the node 1. In the header of the packet, identification information (for example, a local identifier (LID)) of the destination is included. An output port in each of the switches is associated with identification information of a node that is a destination, and each of the switches outputs a packet to an output port corresponding to the identification information of the destination, which is included in the header of the packet. In the example of FIG. 8, the packet reaches the node 1 while passing through the switches C, B, and A in this order.

That is, the network of the fat-tree type system 100 is not a network in which routing is automatically performed such as the Ethernet (registered trademark), but a network in which regular and fixed routing is performed.

Processing that is executed in the system illustrated in FIG. 6 is described below with reference to FIGS. 9 to 24. First, processing that is executed by the routing-data generation device 1 is described with reference to FIGS. 9 to 18.

Figure 9:
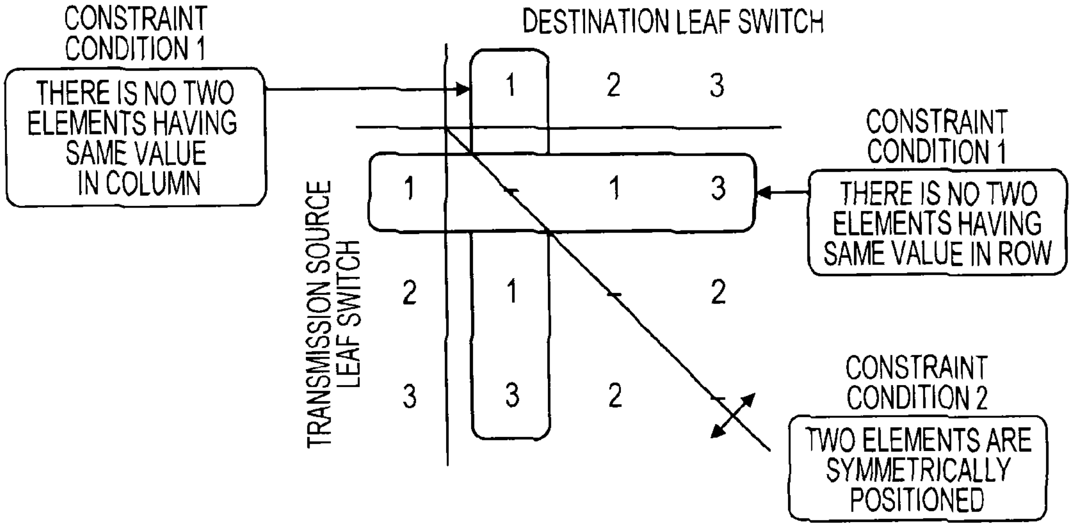
FIG. 9 is a schematic diagram illustrating an example of processing that is executed by a routing-data generation device, according to an embodiment.

The outline of the processing that is executed by the routing-data generation device 1 is descried below with reference to FIG. 9. As illustrated in FIG. 9, routing data is data in which the position in the row direction is identified by identification information of a Leaf switch to which a transmission source node is connected, and the position in the column direction is identified by identification information of a Leaf switch to which a transmission destination node is connected, and an element in the matrix data is identification information of a Spine switch.

The routing-data generation unit 10 in the routing-data generation device 1 generates routing data so as to satisfy a constraint condition 1 and a constraint condition 2. The constraint condition 1 is a condition that there is no two pieces of identification information of Spine switches having the same value in a certain row, and there is no two pieces of identification information of Spine switch having the same value in a certain column. The constraint condition 2 is a condition that two elements in axisymmetrical positions are identical when a sequence of elements each corresponding two pieces of identification information of Leaf switches in the row and column directions are identical are used as a symmetrical axis.

Figure 10:
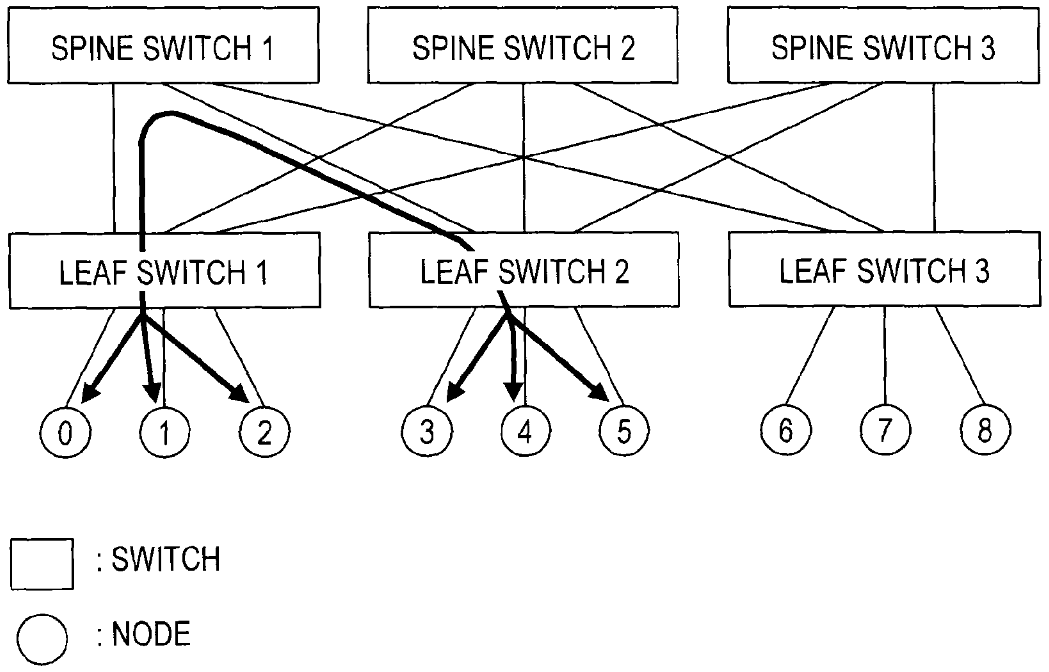
FIG. 10 is a schematic diagram illustrating an example of processing that is executed by a routing-data generation device, according to an embodiment.

When such routing data is generated, a Spine switch through which communication data of the forward path passes and a Spine switch through which communication data of the return path passes become identical. The specific example is described with reference to FIG. 10. In the example of FIG. 10, a node that is under the control of the Leaf switch 1 and a node that is under the control of the Leaf switch 2 communicate with each other. In this case, both of the communication data of the forward path and the communication data of the return path pass through the Spine switch 1, and do not pass through the other Spine switches. In addition, in a case in which setting of routing is performed in accordance with the routing data illustrated in FIG. 9, communication data passes through the Spine switch 3 when the node that is under the control of the Leaf switch 1 and a node that is under the control of the Leaf switch 3 communicate with each other, and communication data passes through the Spine switch 2 when the node that is under the control of the Leaf switch 2 and the node that is under the control of the Leaf switch 3 communicate with each other.

The processing that is executed by the routing-data generation device 1 is described below in detail with reference to FIGS. 11 to 18. First, the order determination unit 13 sets "1" to a variable i (FIG. 11: Step S1), and determines whether or not "i<size" is satisfied (Step S3). Here "size" is a value that indicates the number of Leaf switches, and for example, "size=3" is satisfied in the example of FIG. 10.

When "i<size" is not satisfied (Step S3: No), the processing ends. On the other hand, "i<size" is satisfied (Step S3: Yes), the order determination unit 13 sets the value "i" to a variable x1, sets "0" to a variable y1, sets value "size−1" to a variable x2, and sets value "size−1−i" to a variable y2 (Step S5). Here, x1 and x2 are variables that are used to identify a position in the column direction of the routing data, and y1 and y2 are variables that are used to identify a position in the row direction of the routing data.

The order determination unit 13 determines whether or not the element of (x1, y1) in the routing data has been already determined (Step S7). When the element of (x1, y1) in the routing data has been already determined (Step S7: Yes), the order determination unit 13 increments the variable i by 1 in order to perform processing for the next i (Step S19). In addition, the flow returns to the processing of Step S3.

On the other hand, the element of (x1, y1) in the routing data is not determined yet (Step S7: No), the order determination unit 13 calls the Spine switch determination unit 11. In addition, the Spine switch determination unit 11 executes Spine switch determination processing for the element of (x1, y1) (Step S9). The Spine switch determination processing is described below with reference to FIG. 12.

Figure 12:
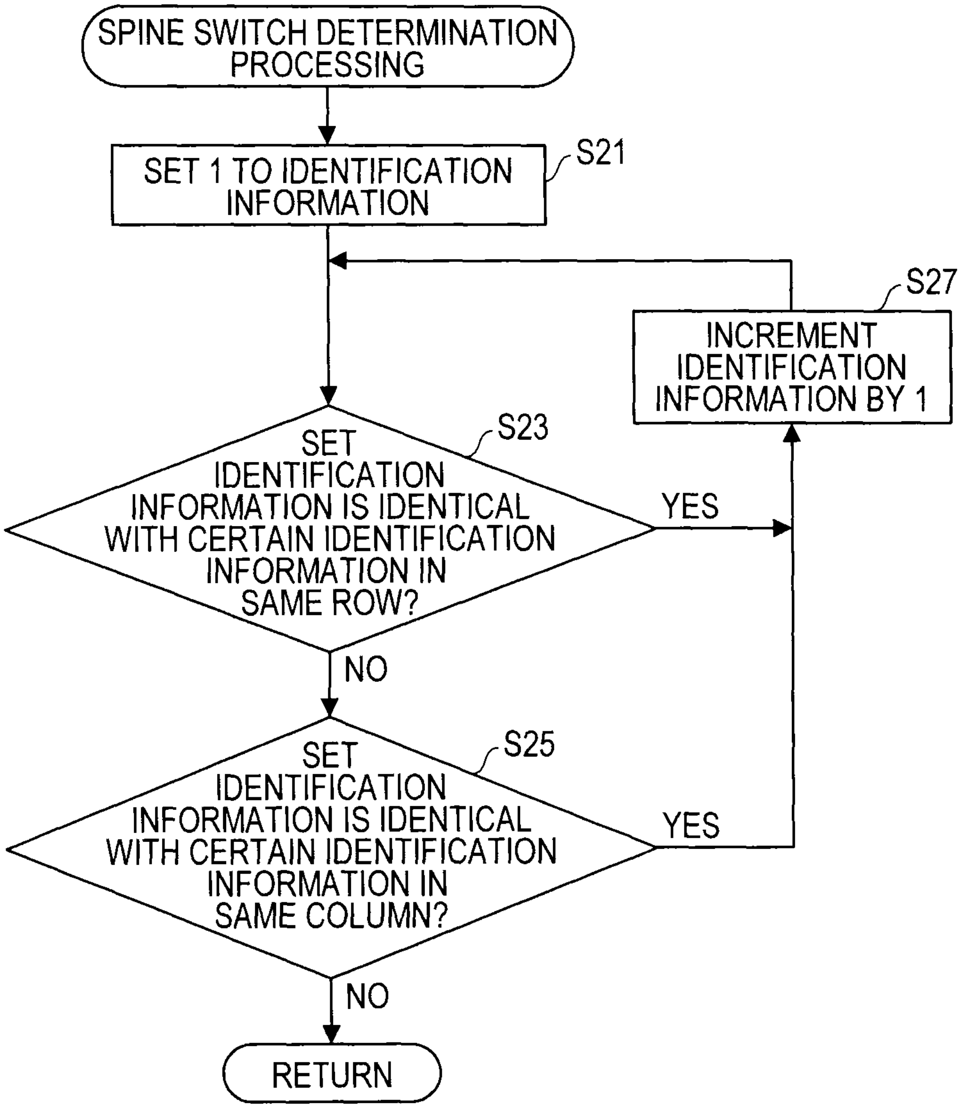
FIG. 12 is a diagram illustrating an example of an operational flowchart for Spine switch determination processing, according to an embodiment.

First, the Spine switch determination unit 11 sets "1" to the identification information of the Spine switch (FIG. 12: Step S21), and the Spine switch determination unit 11 determines whether or not the set identification information is identical with certain identification information in the same row (Step S23). Here, "same row" is a row in which positions in the row direction are the value of y1.

When the set identification information is identical with certain identification information in the same row (Step S23: Yes), the identification information is not allowed to be used, and the Spine switch determination unit 11 increments the identification information by 1 (Step S27). In addition, the flow returns to the processing of Step S23.

On the other hand, when the set identification information is not identical with any identification information in the same row (Step S23: No), the Spine switch determination unit 11 determines whether or not the set identification information is identical with certain identification information in the same column (Step S25). Here, "same column" is a column in which positions in the column direction are the value of x1.

When the set identification information is identical with certain identification information in the same column (Step S25: Yes), the identification information is not allowed to be used, and the Spine switch determination unit 11 increments the identification information by 1 (Step S27). In addition, the flow returns to the processing of Step S23.

On the other hand, when the set identification information is not identical with any identification information in the same column (Step S25: No), the identification information is allowed to be used, and the identification information, and the values of x1 and y1 are output to the data management unit 12. In addition, the flow returns to the calling processing. The data management unit 12 sets the element of (x1, y1) in the routing data that is stored in the routing-data storage unit 14, at the identification information that has been received from the Spine switch determination unit 11.

When the processing as described above is executed, the identification information of the Spine switch may be determined so that the constraint condition 1 is satisfied.

Figure 11:
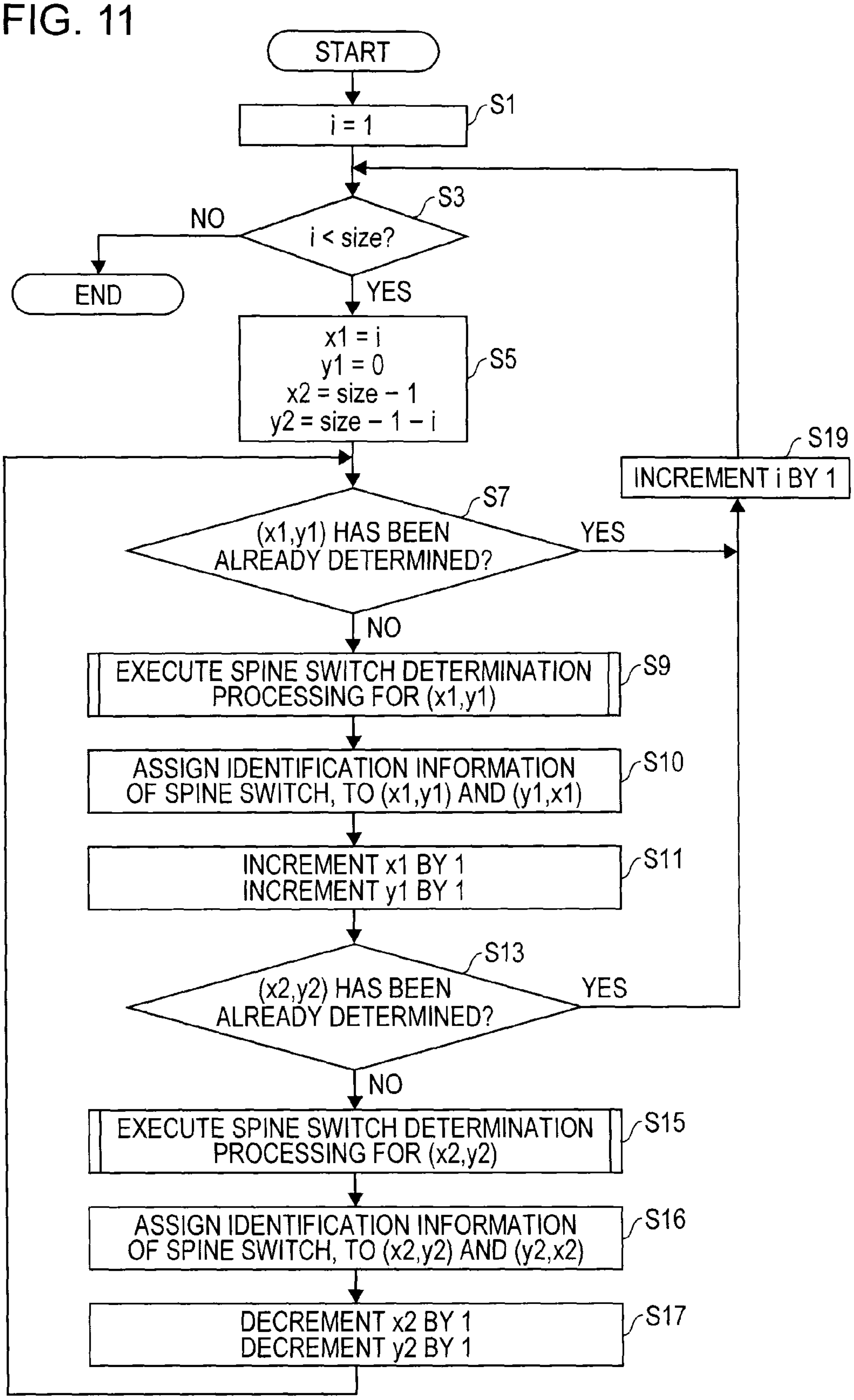
FIG. 11 is a diagram illustrating an example of an operational flowchart for processing that is executed by a routing-data generation device, according to an embodiment.

Returning to the description of FIG. 11, the order determination unit 13 assigns the identification information of the Spine switch that has been determined in the Spine switch determination processing, to (x1, y1) and (y1, x1) (Step S10).

The order determination unit 13 increments x1 and y1 by 1 (Step S11).

The order determination unit 13 determines whether or not the element of (x2, y2) in the routing data has been already determined (Step S13). When the element of (x2, y2) in the routing data has been already determined (Step S13: Yes), the order determination unit 13 increments the variable i by 1 (Step S19) in order to perform processing for the next i. In addition, the flow returns to the processing of Step S3.

On the other hand, the element of (x2, y2) in the routing data is not determined yet (Step S13: No), the order determination unit 13 calls the Spine switch determination unit 11. In addition, the Spine switch determination unit 11 executes the Spine switch determination processing for "(x2, y2)" (Step S15). The Spine switch determination processing is as described above with reference to FIG. 12.

The order determination unit 13 assigns the identification information of the Spine switch that has been determined in the Spine switch determination processing, to (x2, y2) and (y2, x2) (Step S16).

The order determination unit 13 decrements x2 and y2 by 1 (Step S17). After that, the flow returns to the processing of Step S7.

A program that is used to execute the processing that is described above with reference to FIG. 11 is, for example, the program as illustrated in FIG. 13. In addition, a program that is used to execute the processing that is described with reference to FIG. 12 is, for example, the program as illustrated in FIG. 14.

Figure 15:
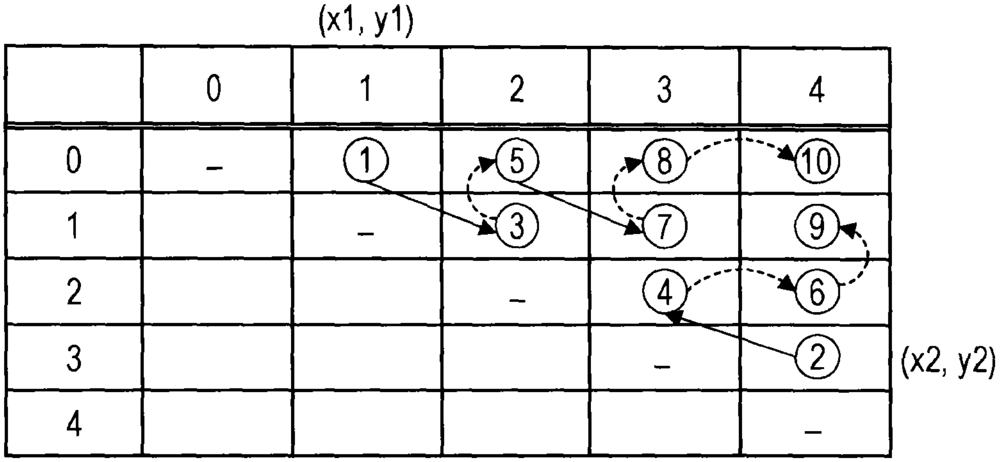
FIG. 15 is a diagram illustrating an example of processing that is executed by a routing-data generation device, according to an embodiment.
Figure 16:
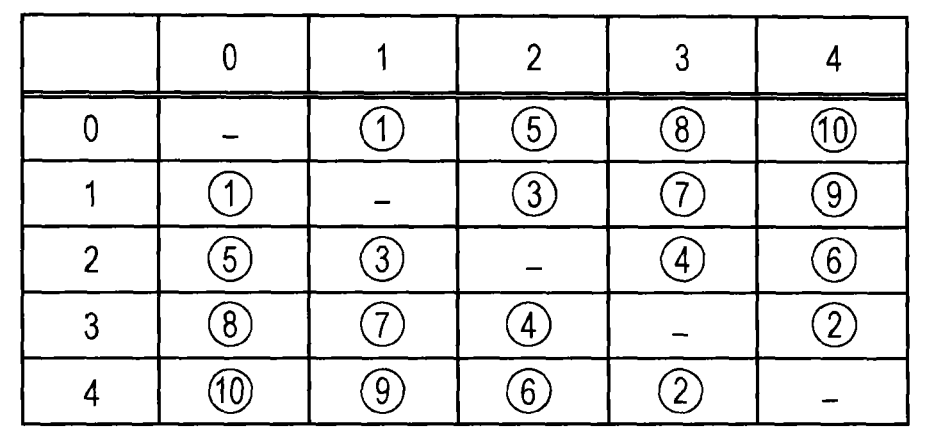
Figure 17:
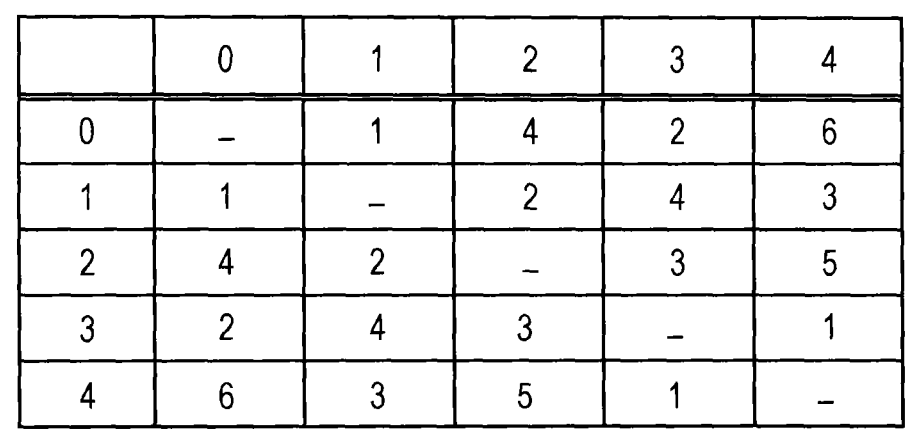

The processing that is described above with reference to FIGS. 11 and 12 is described further specifically with reference to FIGS. 15 to 17.

The order of elements to be processed is described below with reference to FIG. 15. In FIG. 15, the number that is enclosed by a circle indicates processing order, and the arrow indicates transition of a processing target. The arrow of the solid line indicates that the flow does not escape from the loop of the while statement in the program illustrated in FIG. 13, and the arrow of the dotted line indicates that the flow escapes from the loop of the while statement in the program illustrated in FIG. 13.

When the system in which "size=5" is satisfied is executed, as illustrated in FIG. 15, "(x1, y1)" transitions from (1, 0), to (2, 1), to (2, 0), to (3, 1), to (3, 0), and to (4, 0), and (x2, y2) transitions from (4, 3), to (3, 2), to (4, 2), and to (4, 1).

In addition, when a sequence of elements in which the identification information of a Leaf switch in the row direction and the identification information of a Leaf switch in the column direction are identical is used as a symmetrical axis, two elements in axisymmetrical positions are processed in the same order. Thus, the whole routing data is processed in the order that is illustrated in FIG. 16.

After that, when the identification information of the Spine switch is determined by the processing that is described above with reference to FIG. 12, the routing data as illustrated in FIG. 17 is generated eventually.

The routing data that is stored in the routing-data storage unit 14 is displayed on the display device (not illustrated) of the routing-data generation device 1. When the administrator or the like checks the content of the routing data, the administrator or the like builds the fat-tree type system 100 in accordance with the routing data.

Figure 18:
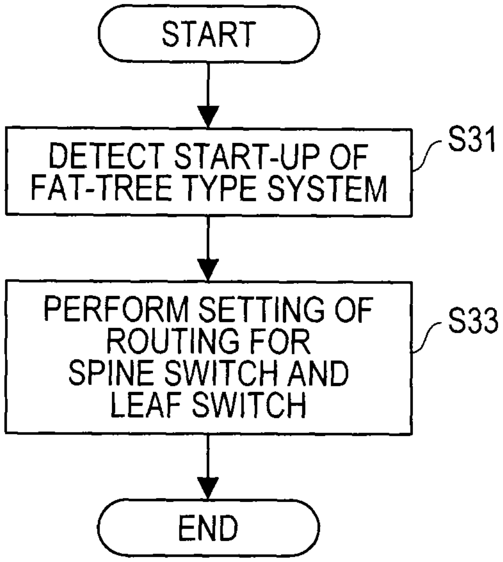
FIG. 18 is a diagram illustrating an example of an operational flowchart for processing executed by a network management unit, according to an embodiment.

When the fat-tree type system 100 that has been built in accordance with the routing data is started up, the network management unit 15 executes the processing as illustrated in FIG. 18.

First, the network management unit 15 detects that the fat-tree type system 100 has been started up (FIG. 18: Step S31).

The network management unit 15 performs setting of routing for the Spine switches and the Leaf switches in the fat-tree type system 100, based on the routing data that is stored in the routing-data storage unit 14 (Step S33). After that, the processing ends.

When the processing as described above is executed, since a Spine switch through which communication data of the forward path passes and a Spine switch through which communication data of the return path passes is identical, the influence range when a failure occurs in the Spine switch is reduced. Therefore, the reliability of the communication may be improved.

In addition, since the number of Spine switches that are related to two Leaf switches becomes one, the maintenance is performed easily.

Figure 19:
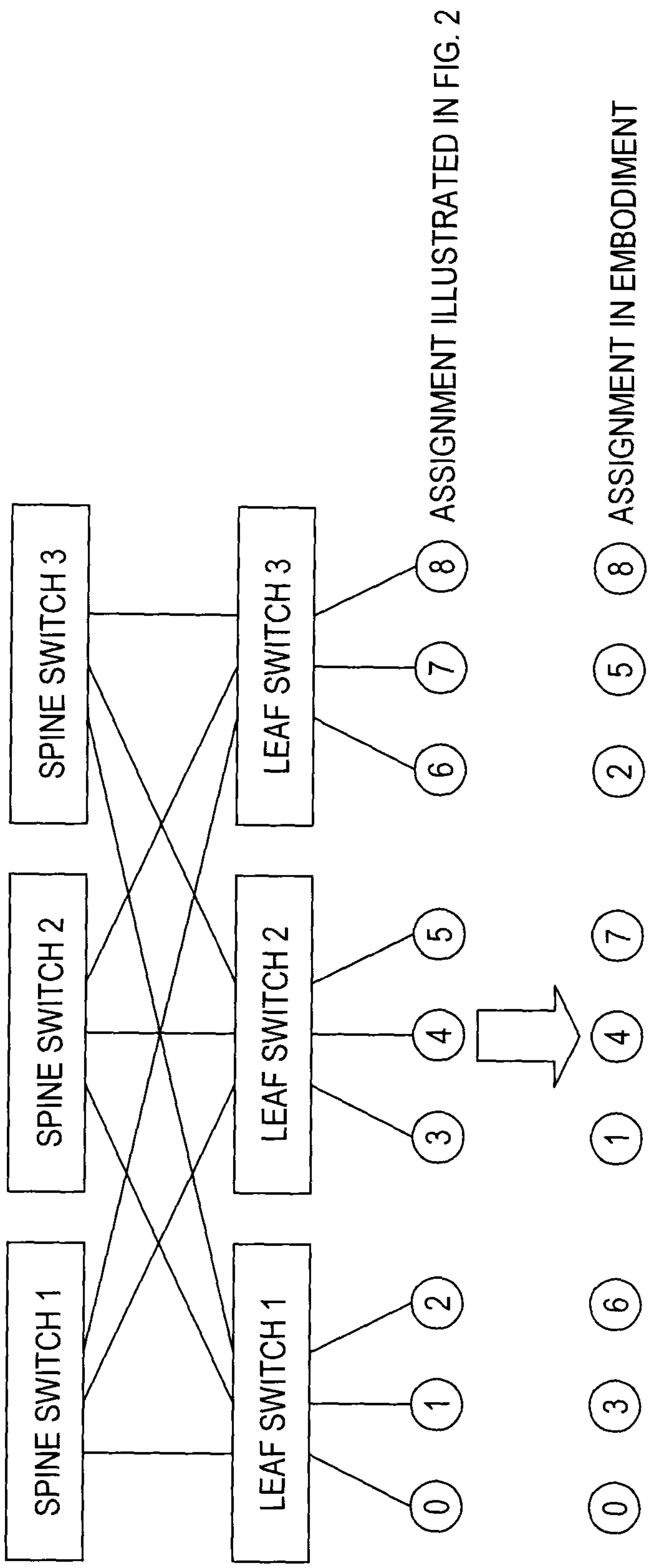
FIG. 19 is a diagram illustrating an example of assigning identification information of a node, according to an embodiment.
Figure 20:
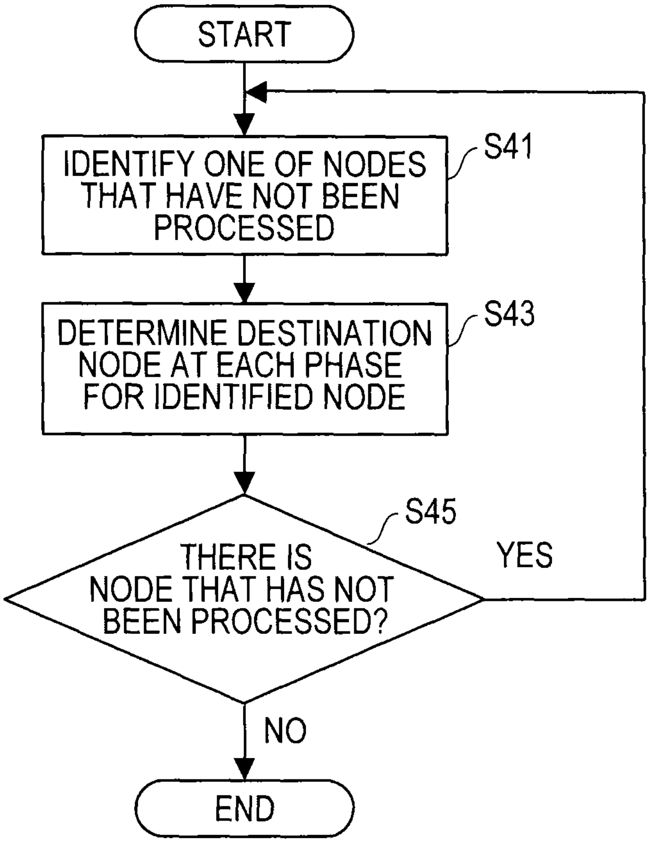
FIG. 20 is a diagram illustrating an example of an operational flowchart for processing that is executed by a node, according to an embodiment.

The processing by which the conflict of a communication route is avoided is described below with reference to FIGS. 19 to 22. In the embodiment, assignment of identification information to a node is not simply performed as illustrated in FIG. 2, but assignment of the identification information is performed as illustrated in FIG. 19. For example, the nodes 0, 3, and 6 are connected to the Leaf switch 1; the nodes 1, 4, and 7 are connected to the Leaf switch 2; and the nodes 2, 5, and 8 are connected to the Leaf switch 3.

In addition, the node 1111 in the fat-tree type system 100 executes the following processing. First, the destination determination unit 1200 in the node 1111 identifies one of nodes that have not been processed yet, from among nodes in the fat-tree type system 100 (FIG. 20: Step S41).

The destination determination unit 1200 determines, for the node identified in Step S41, a destination node that becomes a destination at each of the phases, and stores data that indicates the destination node, in the destination data storage unit 1300 (Step S43). In Step S43, identification information of a destination node at the i-th phase ("i" is an integer of 0 or more to 8 or less) is obtained by "(d*offset+(self+(offset+i/d+i)%d)%d+d*(i/d))%n". Here, "self" indicates identification information of the node that is defined as descried with reference to FIG. 19; "n" indicates the number of nodes; "d" indicates a degree satisfying $n=d^2$; and "offset" indicates, for example, the value illustrated in FIG. 22. In addition, the fractional portion of "i/d" is truncated. The description with reference to FIG. 22 will be made later.

The destination determination unit 1200 determines whether or not there is a node that has not been processed yet left (Step S45). When there is a node that has not been processed yet (Step S45: Yes), the flow returns to the processing of Step S41 in order to process the next node. On the other hand, when there is no node that has not been processed yet (Step S45: No), the processing ends.

In addition, the node 1111 distributes data that is stored in the destination data storage unit 1300, to nodes other than the node 1111. Therefore, the nodes other than the node 1111 may also perform transmission of communication data appropriately.

The example in which the node 1111 executes the processing of Step S43 for all of the nodes in the fat-tree type system 100 is described above, but each of the nodes in the fat-tree type system 100 may execute the processing of Step S43 merely for the each node.

The program that is used to execute the processing described above with reference to FIG. 20 may be, for example, a program as illustrated in FIG. 21.

Figure 22:
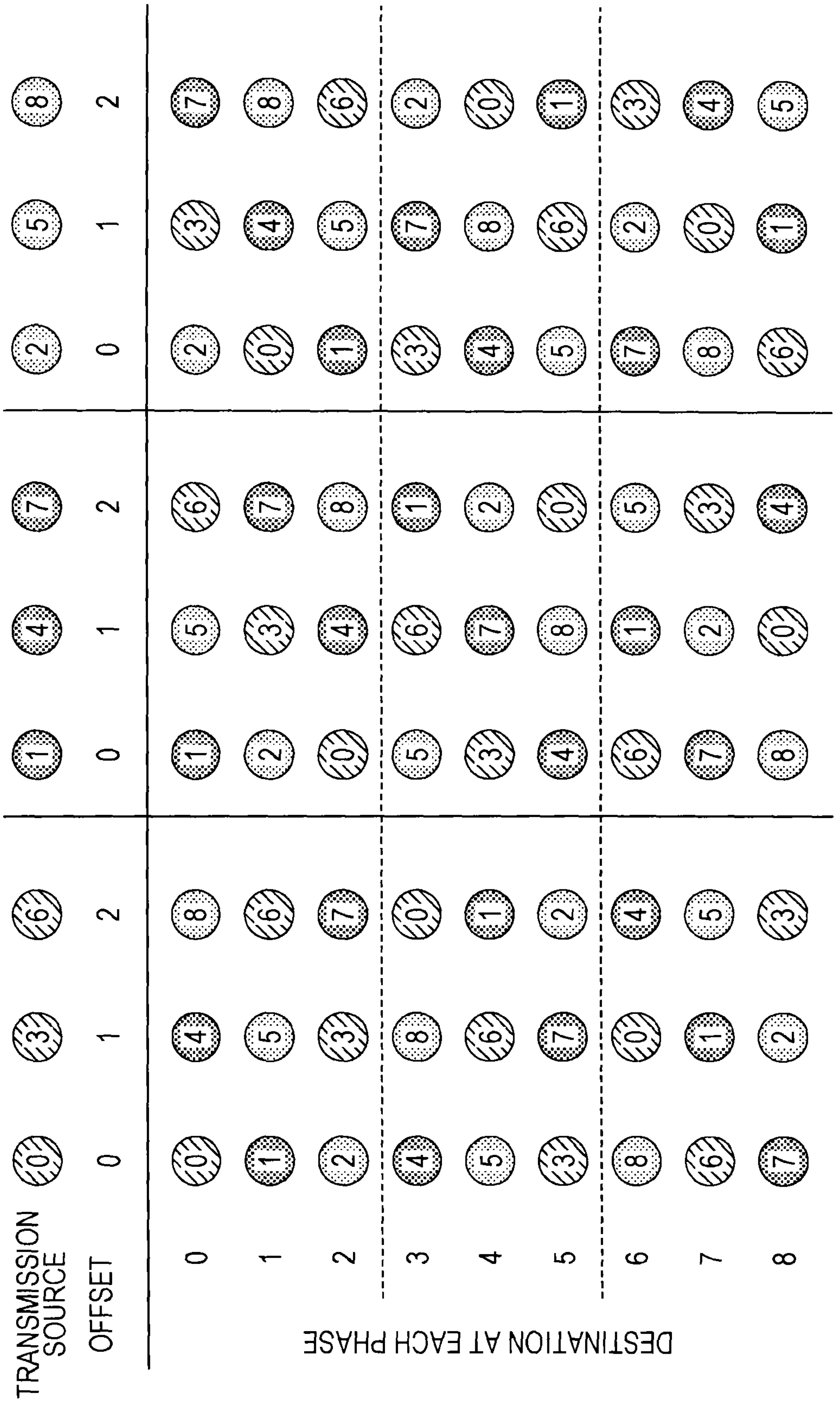
FIG. 22 is a diagram illustrating an example of destination nodes for each of nodes at each phase, according to an embodiment.

In FIG. 22, the destination nodes that have been obtained by the processing of Step S43 are illustrated. The same pattern is applied to the nodes 0, 3, and 6; the same pattern is applied to the nodes 1, 4, and 7; and the same pattern is applied to the nodes 2, 5, and 8. The offset value is 0 for the nodes 0, 1, and 2; the offset value is 1 for the nodes 3, 4, and 5; and the offset value is 2 for the nodes 6, 7, and 8. As illustrated in FIG. 22, at each of the phases, pieces of communication data that have been transmitted from a plurality of nodes that are under the control of an identical Leaf switch are respectively transferred to different Leaf switches. For example, at the phase 2, the node 0 transmits communication data to the node 2 that is under the control of the Leaf switch 3; the node 3 transmits communication data to the node 3 that is under the control of the Leaf switch 1; and the node 6 transmits communication data to the node 7 that is under the control of the Leaf switch 2. Thus, the conflict of the communication route may be avoided.

Figure 23:
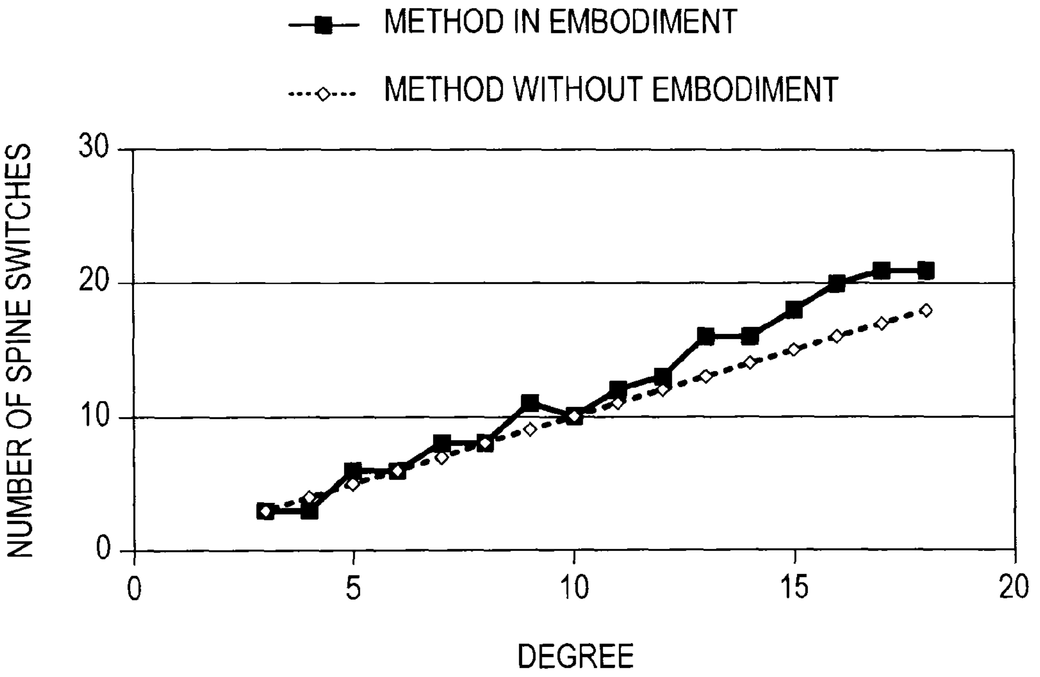
FIG. 23 is a diagram illustrating an example of increase in the number of Spine switches, according to an embodiment.

However, when the method according to the embodiment is utilized, the number of Spine switches is increased. In FIG. 23, a relationship between the number of Spine switches and a degree d is illustrated. In FIG. 23, the horizontal axis indicates the degree, and the vertical axis indicates the number of Spine switches. The solid line indicates the number of Spine switches when the method according to the embodiment is applied, and the dotted line indicates the number of Spine switches when the method according to the embodiment is not utilized. As illustrated in FIG. 23, except a case in which the degree is 4, the number of Spine switches is increased when the method according to the embodiment is applied.

Figure 24:
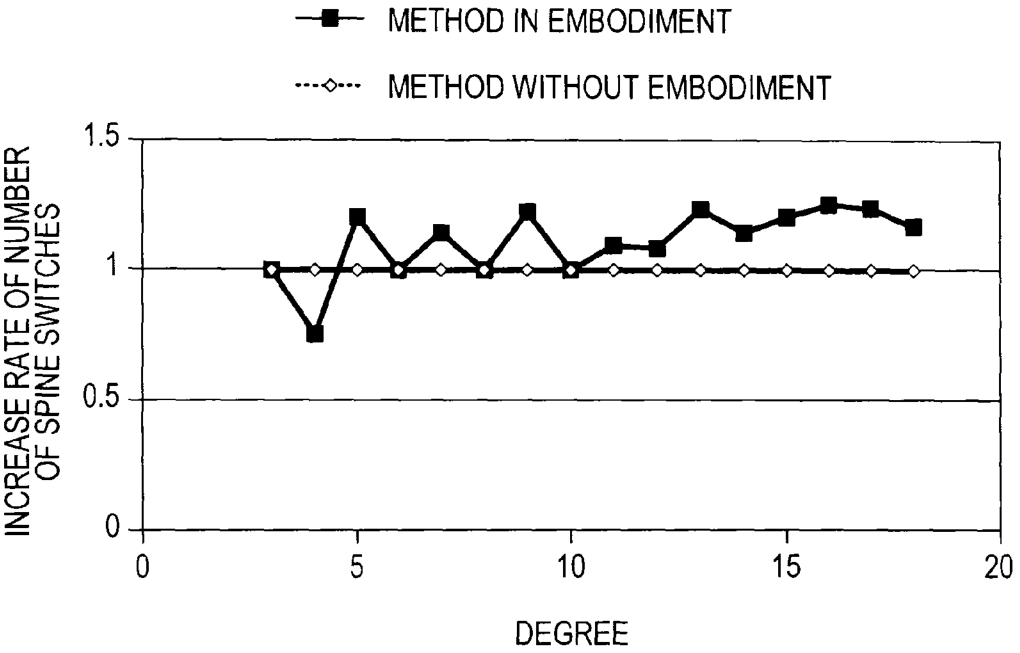
FIG. 24 is a diagram illustrating an example of increase in the number of Spine switches, according to an embodiment.

In FIG. 24, a relation between an increase rate in the number of Spine switches and a degree d is illustrated. The increase rate in the number of Spine switches is obtained by "(the number of Spine switches when the method according to the embodiment is applied)/(the number of Spine switches when the method according to the embodiment is not applied)". In FIG. 24, the horizontal axis indicates the degree, and the vertical axis indicates the increase rate in the number of Spine switches. The solid line indicates the increase rate in the number of Spine switch when the method according to the embodiment is applied, and the dotted line indicates the increase rate in the number of Spine switches when the method according to the embodiment is not applied.

As illustrated in FIG. 24, in a case in which the degree is 18 or less, when the method according to the embodiment is applied, the increase rate is 1.25 at maximum. Therefore, a probability that a failure occurs is increased by the increase rate. However, in the method according to the embodiment, since the influence range of the failure may be halved, the occurrence rate of the failure may be reduced as a whole. As a result, the reliability of the communication may be improved.

The embodiments have been described above, but the embodiments are not limited to such examples. For example, the function block configurations of the above-described routing-data generation device 1 and node 1111 may not be identical with the actual program module configurations.

In addition, the configuration of each of the above-described tables is merely an example, and each of the tables may not have the above-described configuration. In addition, in the processing flow, the order of the pieces of processing may be changed as long as the processing result is not changed. In addition, the pieces of processing may be executed in parallel.

In the above-described example, the network management unit 15 is provided in the routing-data generation device 1, but may be provided in the Spine switch, the Leaf switch, or a node in the fat-tree type system 100. In this case, the network management unit 15 performs setting of the routing, in accordance with the routing data that has been received from the routing-data generation device 1.

In addition, the network in the fat-tree type system 100 is not limited to the network of InfiniBand. A network other than the InfiniBand may be used as long as routing is basically fixed in a manner similar to InfiniBand and the rule for the routing is the same as InfiniBand.

Figure 25:
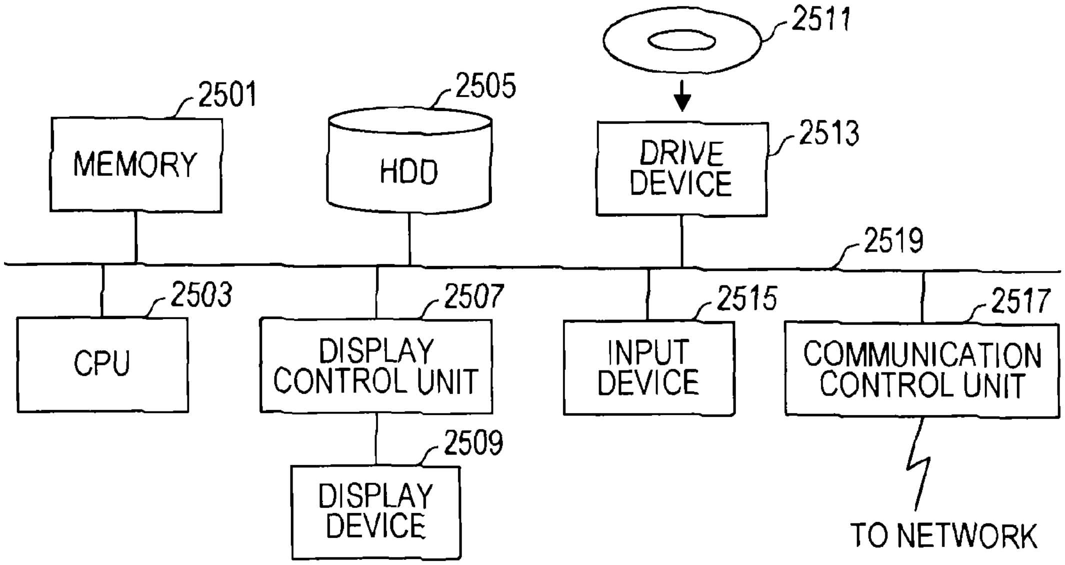
FIG. 25 is a diagram illustrating an example of a configuration of a computer, according to an embodiment.

The above-described routing-data generation device 1 and node are computer devices. As illustrated in FIG. 25, in the computer device, a memory 2501, a central processing unit (CPU) 2503, a hardware disk drive (HDD) 2505, a display control unit 2507 that is connected to a display device 2509, a drive device 2513 for a removable disk 2511, an input device 2515, and a communication control unit 2517 that is used to be connected to the network are connected to each other through a bus 2519. An operating system (OS) and an application program that is used to execute the processing in the embodiments are stored in the HDD 2505, and is read from the HDD 2505 to the memory 2501 when the OS and the application program are executed by the CPU 2503. The CPU 2503 causes a certain operation to be executed by controlling the display control unit 2507, the communication control unit 2517, and the drive device 2513 depending on a processing content of the application program. In addition, data in the middle of being processed is mainly stored in the memory 2501, but may be stored in the HDD 2505. In the embodiments, the application program that is used to execute the above-described processing is distributed so as to be stored in the computer-readable removable disk 2511, and is installed from the drive device 2513 to the HDD 2505. The application program may be installed to the HDD 2505 through a network such as the Internet and the communication control unit 2517. Such a computer device achieves various functions as described above by organically working the hardware, such as the above-described CPU 2503, and memory 2501, and the programs, such as the OS, and the application program, together.

The above-described embodiments are outlined as follows.

A routing-data generation device according to a first aspect of the embodiments includes (A) a data storage unit, and (B) a generation unit that generates routing data that defines a communication route between a plurality of end switches, which are located at the end of a tree in a system in which a plurality of switches are connected to each other like the tree, and a plurality of upper-level switches, which are located above the plurality of end switches in the system, so that a first upper-level switch through which communication data from a first node connected to a first end switch among the plurality of end switches to a second node connected to a second end switch among the plurality of end switches passes is identical with a second upper-level switch through which communication data from the second node to the first node passes, and stores the generated routing data in the data storage unit.

In a case in which a first upper-level switch, through which the communication data from the first node to the second node passes, is different from a second upper-level switch, through which the communication data from the second node to the first node passes, if a failure occurs in any one of the first and second upper-level switches, it becomes difficult to perform the communication between the first and second nodes. Therefore, if the first upper-level switch is identical to the second upper-level switch, the communication data merely passes through a single upper-level switch, thereby improving the reliability of the communication.

In addition, the routing-data generation device may further include (C) a setting unit that performs setting of routing that is executed by the plurality of upper-level switches and the plurality of end switches, using the routing data that is stored in the data storage unit, for the plurality of upper-level switches and the plurality of end switches when the system is started. This allows the plurality of end switches and the plurality of upper-level switches to execute the routing appropriately.

In addition, a second end switch to which a destination node of communication data transmitted from a first node connected to a first end switch is connected, and a third end switch to which a destination node of communication data transmitted from a second node connected to the first end switch is connected may be different from each other at each transmission time point. This allows the conflict of the communication route to be avoided, thereby avoiding the reduction in the performance of the all-to-all communication.

In addition, the above-described routing data may be matrix data in which an element is identified by two positions in the row direction and the column direction, that is, by identification information of two end switches, and an element represents identification information of an upper-level switch. In addition, the above-described generation unit may generate the routing data so that a first condition that there is no two elements representing the same value among a plurality of elements in a single row, and there is no two elements representing the same value among a plurality of elements in a single column, and a second condition that two elements in axisymmetrical positions are identical in a case where a sequence of elements whose identification information in the row and column directions are each identical are used as a symmetrical axis. Therefore, an upper-level switch through which communication data of the forward path passes and an upper-level switch through which communication data of the return path passes may be caused to become identical.

A routing-data generation method according to a second aspect of the embodiments includes (D) generating routing data that defines a communication route between a plurality of end switches, which are located at an end of a tree in a system in which a plurality of switches are connected to each other like the tree, and a plurality of upper-level switches, which are located above the plurality of end switches in the system, so that a first upper-level switch through which communication data from a first node connected to a first end switch among the plurality of end switches to a second node connected to a second end switch among the plurality of end switches passes is identical with a second upper-level switch through which communication data from the second node to the first node passes, and (E) storing the generated routing data in a data storage unit.

A program that is used to cause a computer to execute the processing by the above-described method may be created, and the program is stored, for example, in a computer-readable storage medium such as a flexible disk, a compact disc-read-only memory (CD-ROM), a magneto optical disk, a semiconductor memory, and a hardware disk, or a storage device. The intermediate processing result is temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:

a memory; and a processor coupled to the memory, the processor being configured to:

generate routing data that defines, in a system in which a plurality of switches are connected to each other in a tree-shaped structure, a communication route between a plurality of end switches located at a lower level in the tree-shaped structure and a plurality of upper-level switches located at a level higher than the plurality of end switches in the tree-shaped structure, so that a first upper-level switch that switches communication data from a first node connected to a first end switch among the plurality of end switches to a second node connected to a second end switch among the plurality of end switches is identical with a second upper-level switch that switches communication data from the second node to the first node, and store the generated routing data in the memory, wherein the routing data is configured as matrix data in which a position in a row direction and a position in a column direction are each identified by identification information of one of the plurality of end switches, and each element of the matrix data represents identification information of one of the plurality of upper-level switches; and the processor generates the routing data to satisfy a first condition and a second condition, the first condition being a condition that there is no two identical elements among a plurality of elements in a single row and there is no two identical elements among a plurality of elements in a single column, the second condition being a condition that two elements positioned symmetrical about a symmetrical axis represent identical identification information, the symmetrical axis being defined as a sequence of elements each identified by a pair of identification information of end switches that are identical in both the row and column directions.

2. The apparatus of claim 1, wherein the processor is further configured to, when the system is started up, perform setting of routing that is executed by the plurality of upper-level switches and the plurality of end switches, on the plurality of upper-level switches and the plurality of end switches by using the routing data stored in the memory.

3. The apparatus of claim 2, wherein communication data is transmitted so that an end switch connected to a destination node of communication data transmitted from the first node and an end switch connected to a destination node of communication data transmitted from a third node connected to the first end switch are different from each other at each of times of transmitting communication data.

4. A method performed by a computer, the method comprising:

generating routing data that defines, in a system in which a plurality of switches are connected to each other in a tree-shaped structure, a communication route between a plurality of end switches located at a lower level in the tree-shaped structure and a plurality of upper-level switches located at a level higher than the plurality of end switches, so that a first upper-level switch that switches communication data from a first node connected to a first end switch among the plurality of end switches to a second node connected to a second end switch among the plurality of end switches is identical with a second upper-level switch that switches communication data from the second node to the first node; and storing the generated routing data in a memory provided for the computer, wherein the routing data is configured as matrix data in which a position in a row direction and a position in a column direction are each identified by identification information of one of the plurality of end switches, and each element of the matrix data represents identification information of one of the plurality of upper-level switches, and the routing data is generated so that a first condition and a second condition are satisfied, the first condition being a condition that there is no two identical elements among a plurality of elements in a single row and there is no two identical elements among a plurality of elements in a single column, the second condition being a condition that two elements positioned symmetrical about a symmetrical axis represent identical identification information, the symmetrical axis being defined as a sequence of elements each identified by a pair of identification information of end switches that are identical in both the row and column directions.

5. A non-transitory, computer-readable recording medium having stored therein a program for causing a computer to execute a process comprising:

generating routing data that defines, in a system in which a plurality of switches are connected to each other in a tree-shaped structure, a communication route between a plurality of end switches located at a lower level in the tree-shaped structure and a plurality of upper-level switches located at a level higher than the plurality of end switches, so that a first upper-level switch that switches communication data from a first node connected to a first end switch among the plurality of end switches to a second node connected to a second end switch among the plurality of end switches is identical with a second upper-level switch that switches communication data from the second node to the first node; and storing the generated routing data in a memory provided for the computer, wherein the routing data is configured as matrix data in which a position in a row direction and a position in a column direction are each identified by identification information of one of the plurality of end switches, and each element of the matrix data represents identification information of one of the plurality of upper-level switches, and the routing data is generated so that a first condition and a second condition are satisfied, the first condition being a condition that there is no two identical elements among a plurality of elements in a single row and there is no two identical elements among a plurality of elements in a single column, the second condition being a condition that two elements positioned symmetrical about a symmetrical axis represent identical identification information, the symmetrical axis being defined as a sequence of elements each identified by a pair of identification information of end switches that are identical in both the row and column directions.

* * * * *